United States Patent
Tengler et al.

(10) Patent No.: US 9,247,434 B2
(45) Date of Patent: Jan. 26, 2016

(54) MOBILE-ORIGINATED SMS LOCAL BROADCAST

(75) Inventors: Steven C. Tengler, Grosse Pointe Park, MI (US); Ki Hak Yi, Windsor (CA); Steven P. Schwinke, Plymouth, MI (US); Mark S. Frye, Grosse Pointe Woods, MI (US); Sethu K. Madhavan, Erie, PA (US)

(73) Assignee: General Motors LLC, Detroit, MI (US)

( * ) Notice: Subject to any disclaimer, the term of this patent is extended or adjusted under 35 U.S.C. 154(b) by 1040 days.

(21) Appl. No.: 12/847,681

(22) Filed: Jul. 30, 2010

(65) Prior Publication Data

US 2012/0028607 A1 Feb. 2, 2012

(51) Int. Cl.
*H04W 4/00* (2009.01)
*H04W 12/10* (2009.01)
*H04L 29/06* (2006.01)
*H04W 4/02* (2009.01)
*H04W 4/12* (2009.01)

(52) U.S. Cl.
CPC ............ *H04W 12/10* (2013.01); *H04L 63/126* (2013.01); *H04W 4/02* (2013.01); *H04W 4/021* (2013.01); *H04W 4/12* (2013.01)

(58) Field of Classification Search
CPC ... H04L 12/185; H04L 12/18; H04L 65/4076; H04L 45/74; H04L 12/1886; H04L 63/12; H04L 63/00; H04L 63/126; H04W 4/06; H04W 72/005; H04W 64/00; H04W 4/02; H04W 48/10; H04W 4/12; H04W 12/10
USPC ................. 455/466, 456.1; 709/206
See application file for complete search history.

(56) References Cited

U.S. PATENT DOCUMENTS

| | | | |
|---|---|---|---|
| 2002/0123361 A1* | 9/2002 | Bae | 455/517 |
| 2003/0013466 A1* | 1/2003 | Ahn | 455/466 |
| 2004/0242246 A1* | 12/2004 | Lee et al. | 455/466 |
| 2005/0119016 A1* | 6/2005 | Neumann | 455/466 |
| 2006/0270457 A1* | 11/2006 | Lord | 455/558 |
| 2007/0202894 A1* | 8/2007 | Dhebri et al. | 455/466 |
| 2009/0047929 A1* | 2/2009 | Chesnutt et al. | 455/411 |
| 2009/0172009 A1* | 7/2009 | Schmith et al. | 707/102 |
| 2010/0291894 A1* | 11/2010 | Pipes | 455/404.2 |

OTHER PUBLICATIONS

3GPP, "Short Message Service Cell Broadcast (SMSCB) Support on the Mobile Radio Interface," Dec. 2002, TS 44.012 version 4.0.1 Release 4, All Pages (http://www.etsi.org/deliver/etsi_ts/144000_144099/144012/04.00.01_60/).*

* cited by examiner

Primary Examiner — Allahyar Kasraian
(74) Attorney, Agent, or Firm — Anthony Luke Simon; Reising Ethington P.C.

(57) ABSTRACT

A method and system for local broadcasting of messages from a wireless mobile device to many others located within the same geographic area. This can be done using SMS messaging wherein a message to be broadcast is addressed to a particular designated address and, when received by a wireless carrier system, is checked to determine that it came from an authorized sender, and then is broadcasted by the wireless carrier system to a geographically-limited area within which the sending wireless mobile device is located.

14 Claims, 3 Drawing Sheets

MOBILE-ORIGINATED SMS LOCAL BROADCAST

TECHNICAL FIELD

The present invention relates generally to methods and equipment for communicating locally among people for purposes such as ride sharing, traffic alerts, and social networking and, more particularly, to methods and equipment that carry out such communications using vehicle telematics units and/or portable wireless devices such as cellular phones that can communicate via short message service (SMS).

BACKGROUND

Ride sharing is a useful approach to efficient use of transportation, allowing the movement of people in groups of two or more using a single vehicle. Larger, more congested cities may require longer travel times between destinations and often contain large populations of people that have to commute daily from residential communities outside the city to downtown offices. Many such cities have added high occupancy vehicle (HOV) lanes intended to encourage ride sharing (aka carpooling). Various ways have been employed to place potential carpoolers in contact with each other; most recently, using Internet websites. This can be useful for planned trips or daily work commutes, but not as useful for single ad hoc trips.

In most large cities and elsewhere, wireless communication devices have become ubiquitous, including in particular wireless mobile devices such as cellular phones and vehicle communication devices. Many of these devices use one or more types of communication channels, including voice and data channels, to enable communication and provide a variety of services over wireless networks. They are useful for personal communication to and from individuals and businesses known to the user, but are currently not as useful for distributed communications and, as such, are not particularly useful for directly communicating with local populations of people for purposes such as ride sharing, traffic alerts, etc.

SMS-enabled wireless mobile devices transmit short text messages between different wireless mobile devices, most commonly mobile phones. SMS messaging has a number of desirable attributes that have made it quite a popular form of communicating, including attributes pertaining to its speed and its privacy. The typical use of SMS messaging requires the sender to address the message individually to each intended recipient, whether that be one or many individuals. Thus, SMS as it is widely used today, is not a useful way of connecting with large numbers of people such as potential ride sharing partners.

SUMMARY OF THE INVENTION

According to one embodiment of the invention, there is provided a method of broadcasting a message to nearby wireless mobile devices. The method includes the steps of: receiving a message sent from a wireless communications device over a data connection; determining that the message was directed to a designated broadcast address; and in response to the determination, broadcasting the message to wireless mobile devices within a geographically-limited area within which the wireless communications device is located.

According to another embodiment, the above method can be carried out using SMS messaging wherein the SMS message is addressed by the sender to a particular telephone number that is recognized as such by a wireless carrier system that receives the SMS message. In this other embodiment, the receiving location can be determined and used to geographically limit the broadcast of the SMS message to the same area. Also in this embodiment, the received SMS message is broadcast only if it is authorized (e.g., if it comes from an authorized sender).

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED

The method described herein can be used to enable localized broadcast of messages between wireless mobile devices for purposes such as ride sharing, providing traffic alerts, social networking, etc. The messages can be broadcast from and/or to various types of wireless mobile devices, such as vehicle telematics units and portable personal cellular phones or other wirelessly-enabled devices. The disclosed method is primarily directed to the use of SMS messages to carry out the local broadcasting, but email, instant messaging and other technologies can be used in addition to or in lieu of SMS messages. In general, the method involves sending a message to a designated broadcast address, e.g., a particular telephone number, which, when received by the wireless communication network, is recognized as a message intended for local broadcast. The message may then be authenticated to protect against things such as spamming, and then sent to some or all mobile devices within a geographically-limited area within which the sending wireless mobile device is located. This geographic restriction on the broadcasting of the message can be carried out in various ways, such as by limiting broadcasting to one or more specific base station antennas. For example, the base station on which the sending mobile device is registered can be used as the sole base station from which the message is then broadcast.

As used herein, a wireless mobile device is a type of wireless communications device. Wireless mobile devices include vehicle telematics units, a personal wireless devices (such as a cellular mobile telephone), or other portable devices having wireless communication capability via a chipset or other circuitry that enables the mobile device to communicate wirelessly with other devices or equipment.

Vehicle Communications System—

Figure 1:
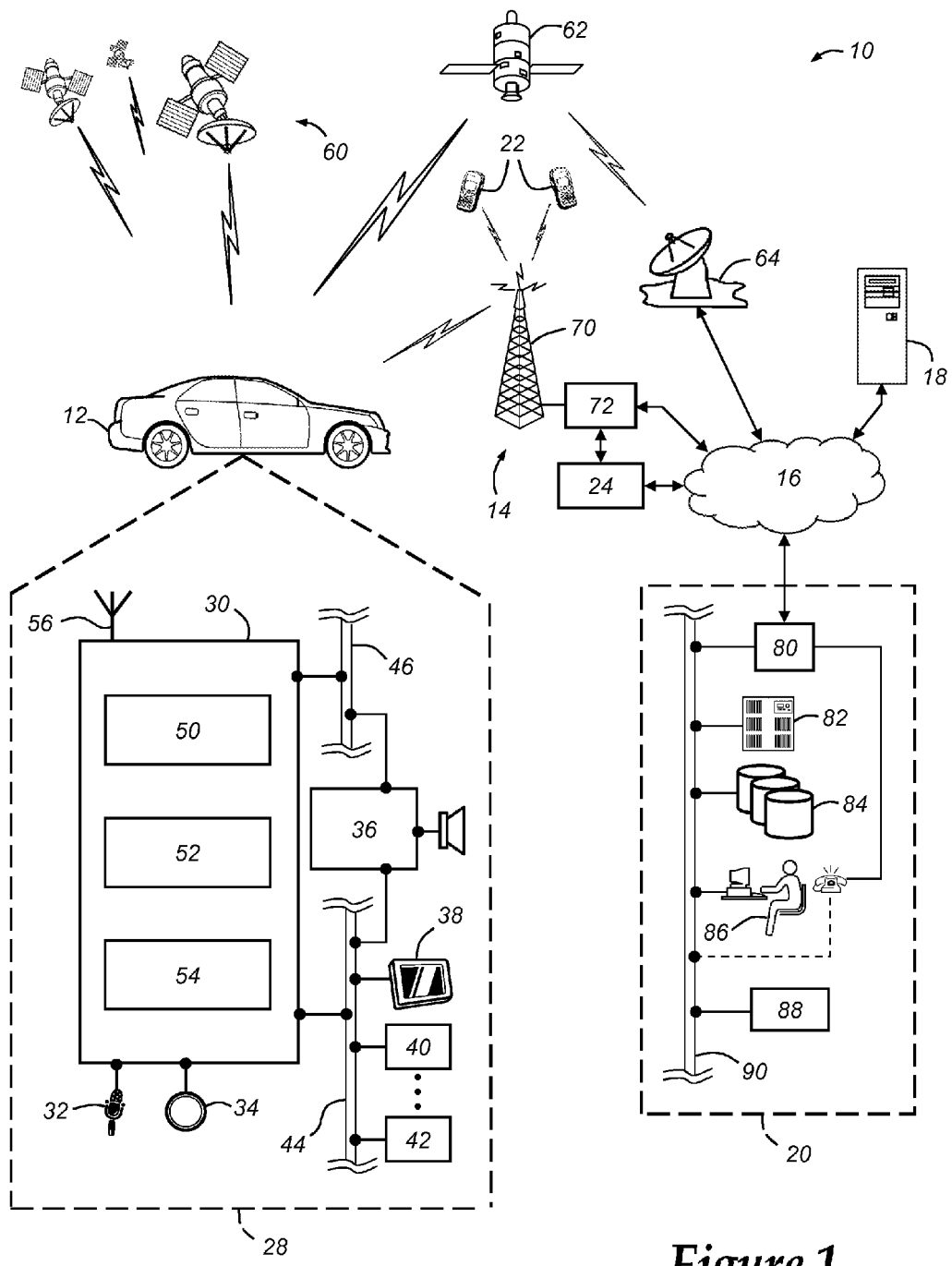
FIG. 1 is a block diagram depicting an exemplary embodiment of a vehicle communications system that is capable of utilizing the present method.

With reference to FIG. 1, there is shown an exemplary operating environment that comprises a vehicle communications system 10 and that can be used to implement the method disclosed herein. Vehicle communications system 10 generally includes a telematics-equipped vehicle 12, one or more wireless carrier systems 14, a land communications network 16, a computer 18, a call center 20, various personal wireless devices 22, and a short message service center (SMSC) 24. It should be understood that the disclosed method can be used with any number of different systems and is not specifically limited to the operating environment shown here. Also, many aspects related to the architecture, construction, setup, and operation of vehicle communication system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed or aftermarket device that enables wireless voice and/or data communication over wireless carrier system 14 and/or a separate wireless network so that the vehicle can communicate with call center 20, other telematics-equipped vehicles, or some other entity or device. According to one embodiment, the telematics unit uses radio transmissions to establish a communications channel (a voice channel and/or a data channel) with wireless carrier system 14 so that voice and/or data transmissions can be sent and received over the communications channel. By providing both voice and data communication, telematics unit 30 enables the vehicle to offer a number of different services including those related to messaging, navigation, telephony, emergency assistance, diagnostics, infotainment, etc. Data can be sent over a data connection, such as via a packet switching connection, or via a voice channel using techniques already known in the art. For combined services that involve both voice communication and data communication, the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet switching data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and from the vehicle. Such services can include: remote control of certain vehicle features through the use of VSMs 42; turn-by-turn directions and other navigation-related services provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the exemplary telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize communications bus 44 to exchange data and commands with the telematics unit.

GPS module 40 receives signals from a constellation of GPS satellites 60. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests and perform other functions. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel, a pop-up visual display, or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Wireless carrier system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14. As mentioned above, it is also possible for vehicle 12 to communicate with one or more wireless networks through wireless protocols such as any of the IEEE 802.11 protocols, WiMAX, or Bluetooth.

Land network 16 may be a conventional land-based telecommunications network that is connected to one or more landline telephones and can connect wireless carrier system 14 to call center 20. For example, land network 16 may include a public switched telephone network (PSTN) such as that used to provide hardwired telephony, packet switching data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or for setting up or configuring subscriber preferences; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, sequence counters, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The personal wireless devices 22 can be, for example, cellular phones or other personal portable devices capable of wireless communication including, for the illustrated embodiment, SMS messaging capability. The devices 22 can communicate with the wireless carriers system, or network, 14 to send and receive voice calls, SMS messages, and possibly other communications such as non-speech data for purposes of providing Internet access, weather information, stock information, etc.

Short message service center (SMSC) 24 is preferably in communication with wireless carrier system 14 and/or land network 16 and is involved in the communication of SMS messages. SMSC 24 can operate according to a store-and-forward principal; that is, when a first user sends an SMS message that is intended for a second user, the SMS message gets stored at the SMSC until the second user is available to receive it. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 24 is but one example of a suitable arrangement, as the SMSC could instead be provided according to some other configuration known in the art. For instance, SMSC 24 could be integrated within wireless carrier system 14 and/or land network 16, instead of being schematically shown as a separate stand-alone component. Also, it is to be understood that multiple SMSCs may be utilized. In general, SMS messages sent to or from the vehicle 12 or wireless mobile devices 22 are received and/or transmitted by the base station 70, and pass through the MSC 72 and SMSC 24 for processing and routing.

Method—

Figure 2:
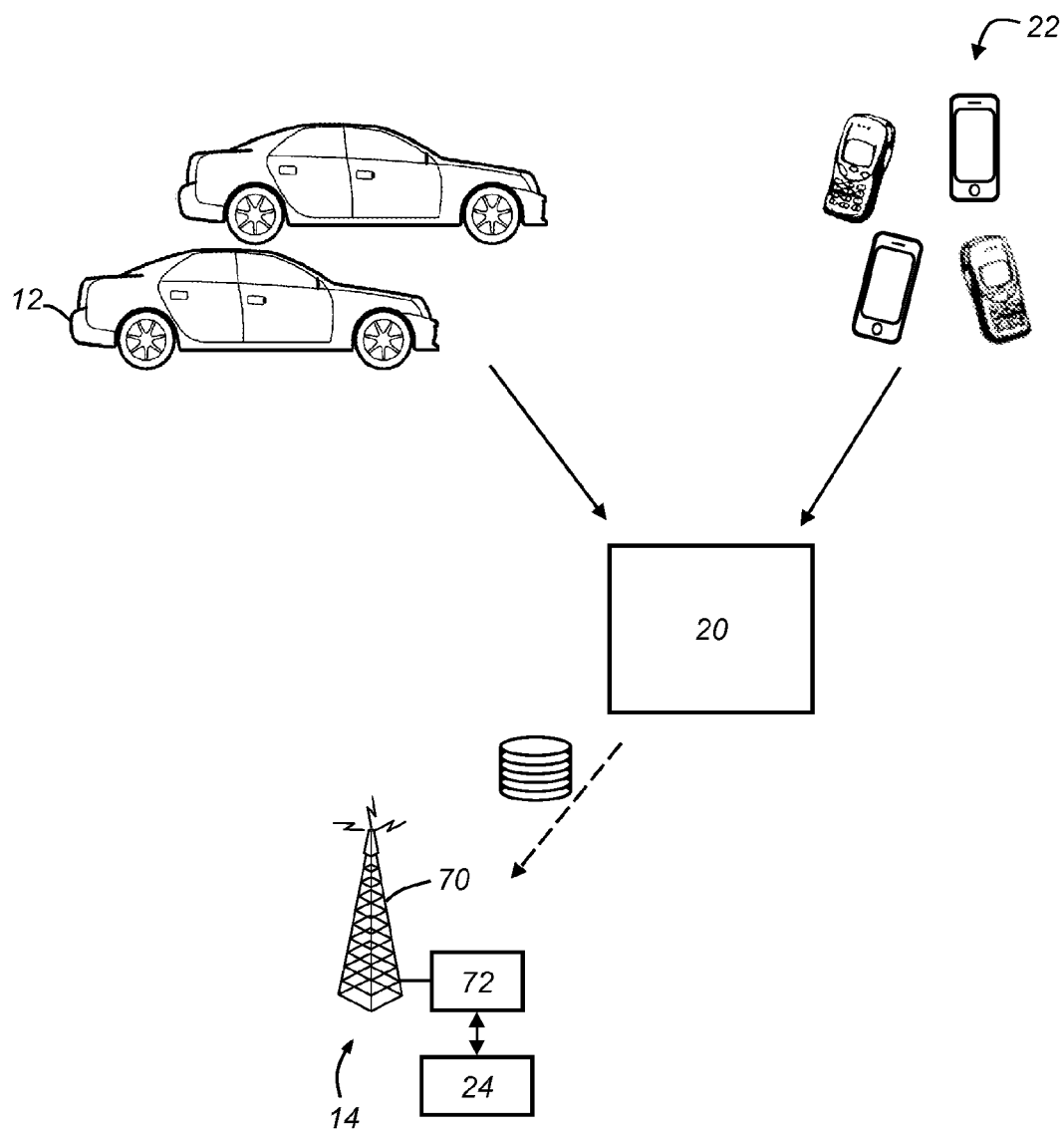
FIG. 2 is a diagram depicting registration of users on the system of FIG. 1 to permit them to send and/or receive broadcasted messages.

An exemplary set of methods for use in enabling localized broadcasting of SMS messages over the wireless communication system 10 will now be described. In the illustrated embodiment, this localized broadcasting of messages can be implemented as a service to which vehicle owners as well as others having personal wireless devices can register or "opt-in". This is shown in FIG. 2. This can be done for the purpose of allowing them to broadcast messages, to receive such messages, or both. Vehicle owners having a telematics-equipped vehicle, such as vehicle 12 with its telematics unit 30, can register the telematics unit 30 with the service, and software stored in the telematics unit can be used to provide a user interface via display 38 or otherwise, in order to provide the user with an easy-to-use means of broadcasting or receiving messages. The telematics unit 30 can be registered with the broadcasting service by presenting the vehicle owner or other subscriber with a menu option that can be selected on the display 38 or by voice command via microphone 32 to cause the telematics unit to send an SMS message or other communication to the call center 20 or to another remotely-located service registration server. The personal wireless devices 22 can register with the service using their SMS capability or can include special programming, such as an "app" that is configured to permit registration of the device. Alternatively, registration can be carried out via a web-portal that presents a text input form or other means of receiving registration information from the user.

The result of registration can be a database of registered users which can be a collection of cellular telephone numbers (for the telematics unit(s) 30, personal wireless devices 22, etc.) or can be other information that, together with the SMS messages received for broadcasting, permits authentication or authorization of the message for subsequent broadcasting. As will be described below, in some embodiments, the authorization of SMS messages to be broadcast is carried out by the call center 20, in which case the database of registered users can be maintained there. In other embodiments, the registration information is provided to the wireless carrier system 14 for database storage at, for example, the SMSC 24 or MSC 72, and this permits authorization and broadcasting of messages without the need to contact call center 20.

An advantage of requiring registration of users is that it can be used to authenticate and/or authorize the broadcasting of the messages received so as to reduce the possibility of spam or mischievous use of the service. Further security measures can be used, such as by having the wireless mobile devices (vehicle telematics units 30 and personal wireless devices 22) register with the base station 70 using a code, device ESN, or other means of ensuring that subsequent messages received by the base station which purportedly come from that device, in fact do so. As one example, rolling codes can be used which can change each time the wireless mobile device registers with the base station or can be changed based on other events, such as following each completed SMS or voice call communication. These codes can be sent with the SMS transmission to authenticate the sending device with the base station.

In other embodiments, registration is not used, and users are free to send or receive locally broadcasted SMS messages. In yet another embodiment, registration is required for a user to be able to broadcast messages, but is not required to receive them. Or, in another embodiment, registration is only used to enable receipt of broadcast messages, in which case anyone will be able to send them, but only those registered will receive them.

Figure 3:
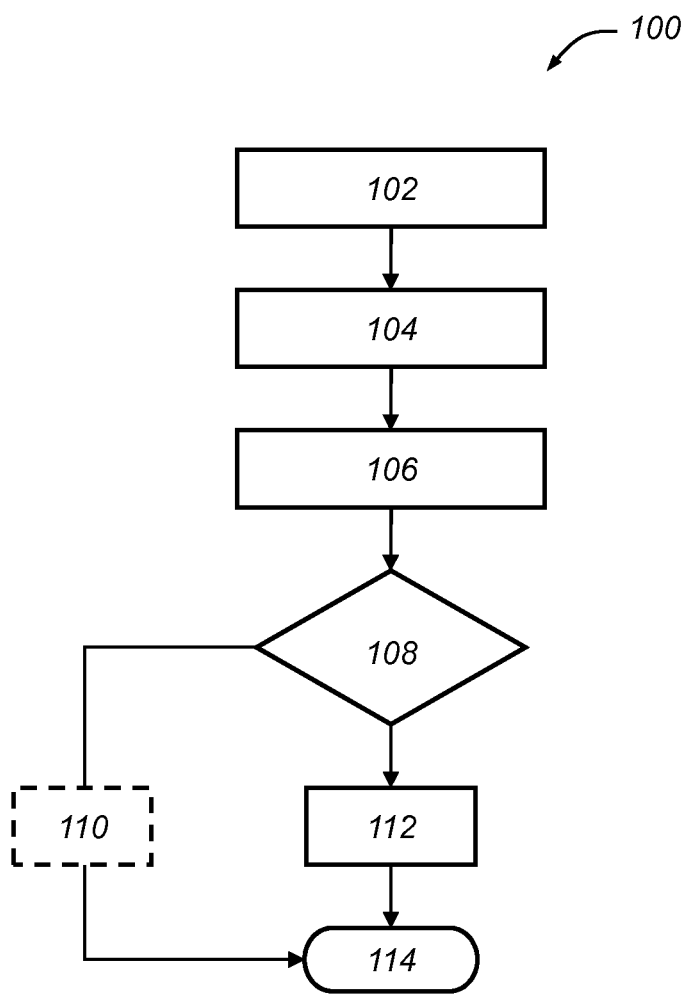
FIG. 3 is a flow chart depicting some of the steps of an embodiment of the present method.

FIG. 3 depicts an overall flowchart for a method 100 of using the service following registration, if any. First, at step 102 the user constructs and sends the SMS message. To do this, the message is addressed to a specially designated address. This designated broadcast address can be a certain telephone number (e.g., 999-999-9999) that is recognized by the wireless carrier system 14 so that the received SMS message is properly processed and/or routed for authorization and broadcasting. This construction and sending of the SMS message can be carried out on one of the personal wireless devices 22, or at the vehicle telematics unit 30. Once the message is sent, then at step 104 it is received by the wireless carrier system 14 at one of its cell towers 70. At step 106 a determination is made that the message is intended for local broadcast—again, this can be based on the fact that it was sent by the user to the designated broadcast address. This determination can be done at the wireless carrier system 14 (e.g., at the SMSC 24 or MSC 72), or can be done at the call center 20. In this latter approach, the SMS message can be processed as normal by the wireless carrier system 14 and sent to the call center 20 based on the designated broadcast address actually being a telephone number assigned to the call center. By receiving the SMS message at the call center using the particular telephone number, the call center can process the SMS message as a broadcast request.

Once it has been determined that the SMS message is one intended to be broadcast locally, a check is made at step 108 to determine if the requested broadcast is authorized. As discussed above, this can be done by comparing sender information (e.g., the originating telephone number) to registration information stored in a database at the wireless carrier system 14 or at the call center 20, or at another remote location. Given that SMS text messages can also be originated via email and converted to a text message by an email to SMS gateway or interface, the sender information used for authorization purpose in this instance can be, for example, the sender's email address, or an originating IP address of the sender's computer or Internet service provider. If not authorized, then the process can end without broadcasting of the message. If desired, a response message can be returned to the sender informing them that the message was not broadcast and/or inviting them to register for the service, as indicated at step 110. If authorized, then at step 112 the message is broadcast to a geographically-limited region within which the sender is located. The process then ends.

Limiting the broadcast to a local geographic region can be done in any of a variety of different ways. In one embodiment, the identification of the cell tower/base station that received the SMS message from the sender can be noted and used as the sole location from which it is then broadcast. Where all the processing of the SMS message (steps 104-108) are carried out within the network (wireless carrier system 14), the receiving base station ID can be determined and temporarily stored until the message is authorized, after which this ID can be used to broadcast the SMS message only to wireless mobile devices currently registered with that base station. In another embodiment, the base station ID or other such information is sent with the SMS message to the call center 20 for authorization, following which this information is then sent back to the wireless carrier system 14 so that it can broadcast the now authorized message from the appropriate base station.

Other ways can be used to determine geographically where to broadcast the SMS message. For example, location information such as GPS coordinates of the wireless mobile device could be included in the SMS payload and used by the call center to identify where the network should broadcast the message. Alternatively, this device location information can be provided to the call center in another way, such as via a separate data call to the call center. In yet another embodiment, a home location for the wireless mobile device can be used by the call center; such home locations are sometimes used for vehicle telematics units as an identification of where the vehicle is normally garaged when not in use. Or, as with the base station ID, location information not obtained from the wireless mobile device can be used, such as an SID of the network. The selection of what geographic indicator is to be used can vary depending on the size of the geographic region and other considerations. The wireless carrier system can be configured to use any of these different geographic area identification approaches to restrict the geographic extent of the broadcast. For example, the wireless carrier system can have map data or other information that can be used to correlate a particular location of the originating wireless mobile device with that of its antennas.

As applied to ride sharing, for example, a user having vehicle 12 with its telematics unit 30 registered for the service may send an SMS message offering to provide one or more others with a ride, stating for example, "Heading from Clarkston 2 RenCen on I-75S. Looking 4 SWF passenger for at least 2 day. Call me at 248-555-9112." This could be entered via the user interface, such as via the display 38 or voice input to the automatic speech recognition system using microphone 32. The message is then sent, authorized, and broadcast to others registered in the same cell. As noted above, beyond ride sharing, the method can be used for other types of communication, e.g., to provide and receive traffic alerts, socializing, and other notifications, such as to send notifications of severe weather, road closures, hazardous material spills, or sources of low cost fuel. To simplify use of the system, each of these different message types (ride sharing versus traffic alerts) can be identified in the SMS message, such as by pre-pending or appending a code onto the text message which can then be received and interpreted as a part of processing the message for broadcasting. For example, a user menu can be provided, whether on the vehicle via display 38 or audibly via audio system 36, or on the personal wireless devices 22 via an app or other special programming. This menu can include different selectable menu items, such as "Ride Share Request", "Traffic Alerts", "Severe Weather Alerts", "Road Closures", "Hazardous Material Spills", "Low Cost Fuel", or "Personals". When the user selects the desired menu item, the system can automatically add on an associated code to the SMS payload. Then, during processing by the network or call center, this code can be extracted and used, for example, to direct the message being broadcast to only those who have registered for that particular type of service, or can be used by the end receiving devices to determine whether to ignore the message or present it to the user of the device. Thus, for example, some users may register to receive and/or send traffic alerts and low cost fuel locations, but not for ride sharing or any social networking functions.

The selective broadcasting of the SMS message to only certain people within the geographic area covered by the broadcast can be achieved in various ways. For example, the wireless mobile devices (whether the telematics unit 30 or personal wireless device 22) can include software that detects receipt of a broadcasted SMS message (e.g., based on the use of the designated broadcast address used by the sender). Then, the devices can look for the appropriate code indicating the message type (e.g., ride share request versus traffic alert) and automatically decide based on that whether to present the message.

Apart from registration, another way to avoid presenting broadcasted messages to those not wishing to participate is to use an encrypted binary SMS message, which will be ignored by standard text messaging programs, but can be decrypted and used by the vehicle telematics unit 30 or other properly programmed wireless mobile devices. Once decrypted, the message can then be presented to the user as text.

While the illustrated embodiment is directed to the use of SMS messages for the localized broadcasting, it will be appreciated that other implementations are possible. For example, local SMS broadcasting can be used to distribute a message received by some means other than SMS. Or, means other than SMS broadcasting can be used to send the message to a particular geographic population. Other such means of communication and distribution will become apparent to those skilled in the art.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of broadcasting a message to nearby wireless mobile devices, comprising the steps of:
   receiving an SMS message sent from a wireless communications device over a data connection;
   determining that the received SMS message was directed to a designated broadcast address; and
   in response to the determination, broadcasting the SMS message to wireless mobile devices within a geographically-limited area within which the wireless communications device is located.

2. The method of claim 1, wherein the wireless communications device comprises a personal portable device.

3. The method of claim 1, wherein the wireless communications device comprises a vehicle telematics unit.

4. The method of claim 1, wherein the designated broadcast address comprises a specific SMS address designated for use in sending SMS messages intended to be broadcast locally to wireless mobile devices.

5. The method of claim 4, wherein the specific SMS address is a telephone number.

6. The method of claim 4, wherein the receiving step further comprises receiving the SMS message at a base station of a wireless cellular system.

7. The method of claim 6, wherein the geographically-limited area comprises a geographic region serviced by the base station.

8. The method of claim 6, further comprising the step of authorizing the SMS message for broadcast and thereafter carrying out the broadcasting step.

9. The method of claim 8, wherein the authorizing step further comprising sending the SMS message from the base station to a short message service center (SMSC), determining if the sender of the SMS message is authorized to broadcast the SMS message and then sending the SMS message to the base station for broadcasting to at least some of the wireless mobile devices that are registered with the base station.

10. The method of claim 6, wherein the broadcasting step further comprises broadcasting the SMS message from the base station to at least some of the wireless mobile devices that are registered with the base station.

11. The method of claim 10, further comprising the steps of sending the SMS message to a call center, forwarding the SMS message from the call center to a wireless carrier system with broadcast location information used to restrict broadcasting of the SMS message to the geographically-limited area, and wherein the broadcasting step further comprises receiving the forwarded SMS message and location information at the wireless carrier system, and broadcasting the forwarded SMS messages to wireless mobile devices within the geographically-limited area using the location information.

12. The method of claim 11, wherein the location information identifies at least one base station of the wireless carrier system.

13. The method of claim 1, wherein the broadcasting step further comprises broadcasting the SMS message as an encrypted binary message.

14. The method of claim 13, further comprising the step of receiving the encrypted binary message at a telematics unit in a vehicle, decrypting the encrypted binary message, and presenting it to an occupant of the vehicle.

* * * * *